United States Patent [19]
Kim

[11] Patent Number: 5,742,922
[45] Date of Patent: Apr. 21, 1998

[54] VEHICLE NAVIGATION SYSTEM AND METHOD FOR SELECTING A ROUTE ACCORDING TO FUEL CONSUMPTION

[75] Inventor: Hyun-Chul Kim, Seoul, Rep. of Korea

[73] Assignee: Hyundai Motor Company, Seoul, Rep. of Korea

[21] Appl. No.: 600,167

[22] Filed: Feb. 12, 1996

[51] Int. Cl.$^6$ .......................... G01C 21/00; G06F 165/00
[52] U.S. Cl. .............................................. 701/201; 701/213
[58] Field of Search .................... 364/424.02, 449, 364/424.01, 436, 443, 444, 444.1, 444.2, 449.1, 449.2, 449.3, 449.7, 424.013, 424.027, 424.029; 340/995; 342/357, 457

[56] References Cited

U.S. PATENT DOCUMENTS

| | | | |
|---|---|---|---|
| 4,159,088 | 6/1979 | Cosley | 244/182 |
| 4,346,288 | 8/1982 | Foster | 235/70 A |
| 4,663,718 | 5/1987 | Augello et al. | 364/444 |
| 5,205,161 | 4/1993 | Erwin | 73/114 |
| 5,351,776 | 10/1994 | Keller et al. | 180/79.1 |
| 5,406,491 | 4/1995 | Lima | 364/449 |
| 5,442,349 | 8/1995 | Inoue et al. | 340/995 |
| 5,457,634 | 10/1995 | Chakravarty | 364/444 |
| 5,504,482 | 4/1996 | Schreder | 340/995 |
| 5,532,690 | 7/1996 | Hertel | 340/989 |
| 5,557,522 | 9/1996 | Nakayama et al. | 364/424.02 |

*Primary Examiner*—Michael Zanelli
*Attorney, Agent, or Firm*—Finnegan, Henderson, Farabow, Garrett & Dunner, L.L.P.

[57] ABSTRACT

A vehicle navigation system and method of selecting a route for vehicle travel according to fuel consumption. The system includes an input device for selecting a destination, an antenna for receiving satellite signals and/or signals related to traffic situation, a memory, and a controller, such as a microcomputer, for determining a current vehicle position and alternative routes from the current vehicle position to the destination and for selecting from the alternative routes, according to altitude information for the routes and the traffic situation, a preferred route requiring the least fuel consumption. The method includes the steps of determining the current vehicle position based on signals received from satellites, determining the routes from the current position to the destination, and selecting from the routes the preferred route requiring the least amount of fuel consumption.

20 Claims, 2 Drawing Sheets

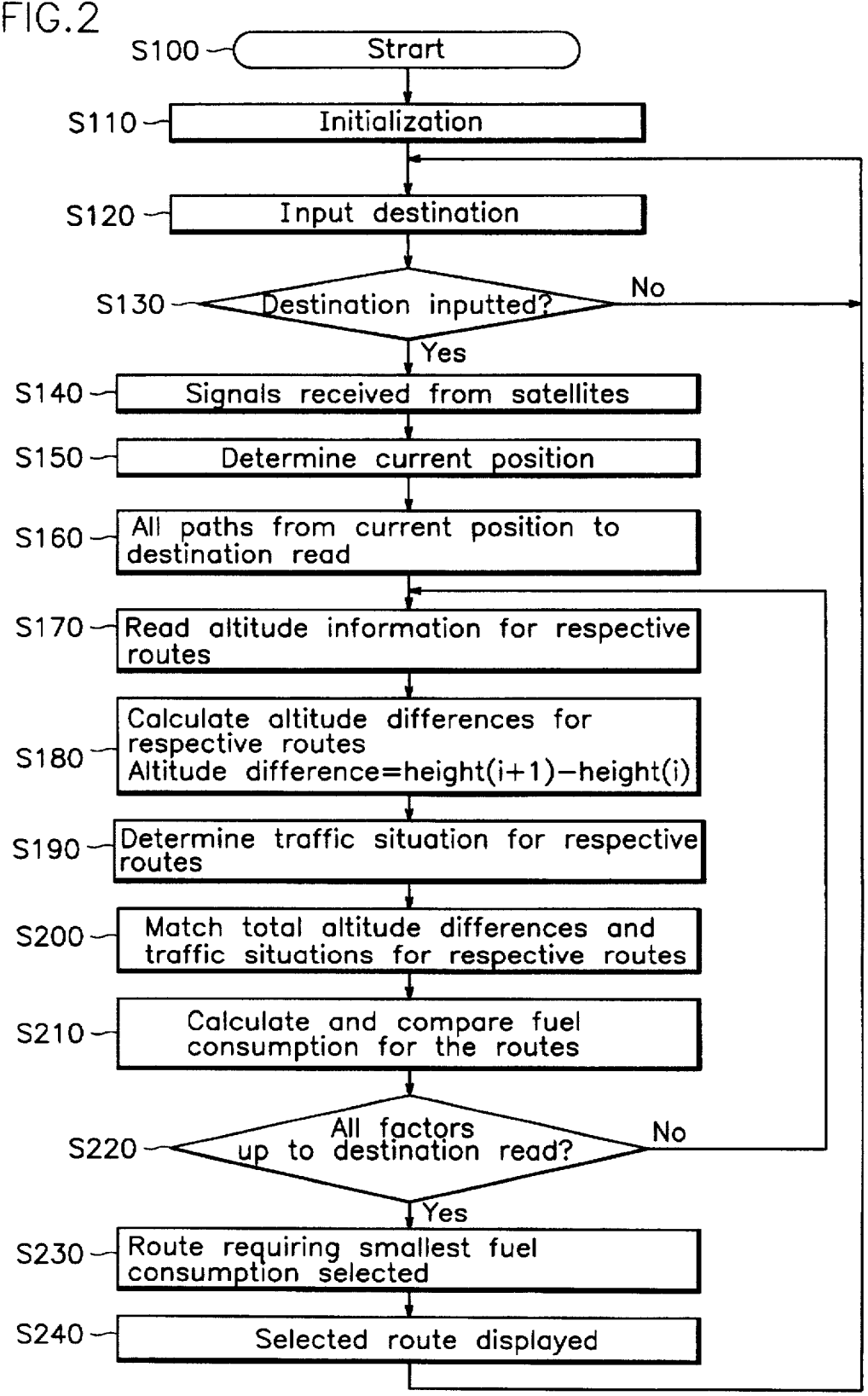

5,742,922

VEHICLE NAVIGATION SYSTEM AND METHOD FOR SELECTING A ROUTE ACCORDING TO FUEL CONSUMPTION

BACKGROUND OF THE INVENTION

1. Field of the Invention

The present invention relates to a vehicle navigation system and method for selecting a travel route in accordance with fuel consumption. More particularly, the present invention relates to a system and method for determining alternative routes from a current vehicle position to a destination and selecting from the alternative routes, according to altitude information and traffic situation, a preferred route requiring the least fuel consumption.

2. Description of the Related Art

The automobile manufacturing industry has been studying a number of different navigating devices for orienting or directing a driver to a destination. For example, one of these navigating devices includes a liquid crystal display mounted in a dashboard for displaying a map of the geographic area in which an automobile is located. In the future, when the automobile manufacturers provide the navigating devices as a standard component in automobiles, drivers, who may be unfamiliar with either current road conditions or the local geography, will benefit considerably from this technology.

In Japan, for example, the automobile manufacturers are testing a number of different types of navigating devices. As of yet, manufacturers have not equipped many automobiles with these devices. Automobile manufacturers, however, predict that in ten years they will equip at least 20% of new automobiles with the navigating device.

Navigation devices relieve drivers from the stress and anxiety associated with driving in an unfamiliar area. Most navigating devices display one of a multitude of maps having a variable scale ranging, for example, from one to one hundred thousandth to one to ten thousandth. Besides showing highways, roads, and services areas, the maps show major building locations so that a lost driver can find the proper route to an intended destination.

Automobile navigation devices typically include sensing systems or global positioning satellite (GPS) systems for tracking vehicle location. The navigating devices including a sensor system operate by sensing the direction and distance of vehicle travel to determine the current position of an automobile. Such sensing systems, however, generate at least a slight error after the vehicle travels a long distance.

The GPS navigating devices receive signals from United States Defense Department satellites which orbit the earth and transmit at a frequency of 1575.42 MHz. To determine a current vehicle position, the GPS systems calculate wave travel time from 3 or 4 satellite signals depending on whether a position measurement is respectively two-dimensional or three-dimensional. At present, 16 GPS satellites are in orbit enabling a two-dimensional position measurement for 22 hours per day. Soon, however, up to 27 satellites could be in orbit to allow for three-dimensional position measurement 24 hours a day.

Navigational devices using the GPS system reliably determine map location of a vehicle. The accuracy of the GPS navigating devices, however, depends on the specific program operating the GPS system, which is maintained as a trade secret by many manufacturers.

In addition, the conventional navigation devices do not consider factors such as road contour or traffic condition. Therefore, these devices display routes of travel without considering fuel consumption of a vehicle. As fuel costs escalate, natural resources become depleted, and government authorities further regulate vehicle fuel economy, minimizing fuel consumption will be of great importance.

In light of the foregoing, there is a need in the art for a system and method for selecting a route according to fuel consumption.

SUMMARY OF THE INVENTION

Accordingly, the present invention is directed to a vehicle navigation system and method for selecting from alternative routes a preferred route requiring the least fuel consumption.

The system of the invention includes an input device for selecting a destination, an antenna for receiving signals from GPS satellites, a frequency converter for converting signals received by the antenna into low frequency signals, a signal processor for processing the low frequency signals into computer-recognizable signals, a memory for storing data representative of local area routes and altitude information for the routes, and a controller responsive to the computer-recognizable signals for determining a current vehicle position and alternative routes from the current vehicle position to the destination, and for selecting from the alternative routes a preferred route requiring the least fuel consumption in view of the altitude information.

Additionally, the present invention includes a vehicle navigation method including the steps of selecting a destination, receiving signals from GPS satellites, determining a current vehicle position based on the signals received from the satellites, determining alternative routes from the current vehicle position to the destination, calculating fuel consumption required for each of the alternative routes based upon change of altitude of each of the alternative routes, selecting from the alternative routes a preferred route requiring the least amount of fuel consumption, and displaying the preferred route.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings, FIG. 2 is a flow chart showing steps of a vehicle navigation method in accordance with the preferred embodiment of the present invention.

DESCRIPTION OF THE PREFERRED EMBODIMENTS

Figure 1:
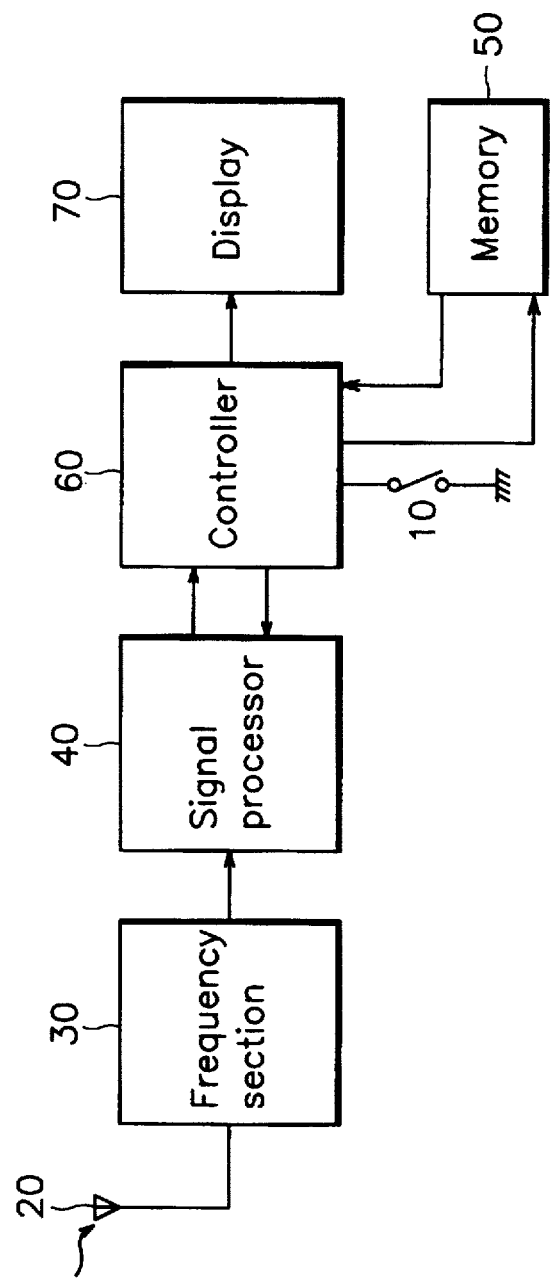
FIG. 1 is a block diagram of a vehicle navigation system in accordance with a preferred embodiment of the present invention.

Reference will now be made in detail to the present preferred embodiments of the invention, examples of which are illustrated in the accompanying drawings.

In accordance with the invention, as shown in FIG. 1, a vehicle navigation system capable of selecting a route according to fuel consumption includes an input device 10, such as a position selecting switch, a key pad, a light pen, or other device for selecting a desired destination.

The system further includes antenna 20 installed on a vehicle body (not shown), such as an automobile or truck body, for receiving signals transmitted from GPS satellites (not shown). The antenna 20 preferably also receives signals representing local traffic situations, such as, for example, traffic congestion, vehicle accidents, average waiting time at traffic signals, and road construction. In the preferred embodiment, antenna 20 receives signals from local traffic authorities which transmit specifically recognizable codes for individual traffic situations along vehicle routes in an area.

As shown in FIG. 1, the system preferably includes a frequency converter 30 for converting any high frequency signals received by antenna 20 into easily processed low frequency signals and a signal processing section 40 for processing signals from the frequency converter 30 by an inverse-expansion method, for example, so as to output computer-recognizable signals. Additionally, the preferred embodiment also includes a memory 50 for storing information, such as each of the vehicle routes for particular localities, the altitudes for predetermined intervals along those vehicle routes, and fuel consumption data for the particular vehicle in which the system is to be installed.

In the preferred embodiment, controller 60, such as a microcomputer, receives the computer-recognizable signals from the signal processor 40 and reads data from the memory 50 concerning routes and the altitudes for intervals along those routes. As described in more detail below, controller 60 determines both a current position of the vehicle and the routes from the current position to the selected destination. In addition, controller 60 selects from the determined routes a preferred route requiring the least amount of fuel consumption according to the altitude information and the traffic situation information.

As illustrated in FIG. 1, the embodiment preferably includes display 70 mounted to a dashboard of the vehicle. In response to controller 60, display 70 displays the current position of the vehicle, the input destination, the routes between the current position and the destination, and the preferred route, thereby orienting the driver to the destination along the preferred route. In a preferred embodiment, input device 10 is an integral component of the display 70 allowing input of the desired destination by touching a portion of display 70.

In accordance with the invention, there is also provided a vehicle navigation method for selecting a route according to fuel consumption. This method is explained below with reference to the embodiments described above. It should be understood that the method of the invention is not limited to the structure disclosed herein.

In accordance with the present invention and with reference to FIGS. 1 and 2, when a driver starts a vehicle having the system of the present invention, controller 60 begins a routine S100 and initiates circuits and parameters S110. After the driver enters the desired destination into input device 10, controller 60 receives signals from the input device 10 S120 and determines whether the driver has entered a proper destination S130. If the driver enters an improper destination such as, for example, a destination beyond the routes stored in memory 50, display 70 shows a message instructing the driver to input other destination information.

After input of the destination, antenna 20 receives signals from 3 or 4 GPS satellites depending upon the number of satellite signals within range of antenna 20 S140. The satellites transmit the signals received by antenna 20 at a frequency of 1.2 or 1.5 GHz in a broad band, and carrier waves carry the signals to antenna 20 according to a spectrum expansion method. Frequency converter 30 converts these high frequency signals into low frequency signals to facilitate signal processing.

Signal processor 40 conducts inverse expansion processing of the low frequency signals to convert them into computer-recognizable signals. Controller 60 then determines the current position of the vehicle based on the computer-recognizable signals S150 and determines all of the paths from the current position to the destination by reading route data stored in memory 50 S160. The current position, destination, and routes therebetween are displayed on display 70.

For each of the routes, controller 60 reads altitude information for intervals of a predetermined distance along a particular route S170, and then calculates altitude difference between each adjacent pair of the intervals (i) and (i+1) along the particular route S180. Controller 60 adds each calculated altitude difference between the adjacent pairs of the intervals (i) and (i+1) of the particular route to determine the total altitude distance the vehicle must travel if it drives along the route. For a relatively flat or level route, the total altitude distance of travel is small, so the vehicle fuel consumption required for climbing or descending is not significant. However, the converse is true for mountainous or "hilly" routes.

When antenna 20 receives the signals related to the traffic situation from a traffic authority, these signals pass from frequency converter 10 and signal processor 20 to controller 60 which determines the traffic situation for each of the routes between the current position and the destination S190. Controller 60 matches the total altitude distance of travel and traffic situation for respective paths S200 and reads corresponding fuel consumption data from memory 50 for the particular altitude differences and the traffic situation of each respective path. Based on the fuel consumption data, controller 60 calculates the fuel consumption the vehicle would require to travel along each of the paths and compares these required fuel consumptions S210.

After ensuring that the all of the appropriate information has been read from memory 50 S220, controller 60 selects a preferred path requiring the least amount of fuel consumption S230. The preferred route is displayed on display 70 along with the current position, destination, and, optionally, the other routes between the current position and the destination, so that the driver can easily monitor the progression of travel.

After a predetermined period of time elapses or after travelling for a predetermined distance, controller 60 may repeat some or all of the above-mentioned steps to monitor the current traffic situation and select the preferred path based on this current condition. Alternatively, as shown in FIG. 2, controller 60 awaits driver input into the input device 10 of another destination.

Because the present invention operates as described above, it selects and displays a route requiring the least fuel consumption by taking into account variables such as the current traffic situation and hills. Thus, the invention enables the driver to reach a destination in a speedy manner without wasting an excessive amount of fuel.

It will be apparent to those skilled in the art that various modifications and variations can be made to the structure and methodology of the present invention without departing from the scope or spirit of the invention. In view of the foregoing, it is intended that the present invention cover modifications and variations of this invention provided they fall within the scope of the following claims and their equivalents.

What is claimed is:

1. A ground vehicle navigation system for selecting a route according to fuel consumption, comprising:

an input device for selecting a destination;

an antenna for receiving signals from GPS satellites;

a frequency converter for converting signals received by the antenna into low frequency signals;

a signal processor for processing the low frequency signals into computer-recognizable signals;

a memory for storing data representative of local area routes and altitude information for the routes; and a controller responsive to the computer-recognizable signals for determining a current vehicle position and alternative routes from the current vehicle position to the destination, and for selecting from the alternative routes a preferred route requiring the least fuel consumption in view of the altitude information.

2. The ground vehicle navigation system as recited in claim 1, wherein the antenna receives signals representative of traffic situation on the local area routes and wherein the controller selects the preferred route in view of the altitude information and the traffic situation.

3. The ground vehicle navigation system as recited in claim 2, wherein said controller calculates altitude differences between adjacent predetermined intervals of the alternative routes, reads from the memory respective fuel consumption data for each of the alternative routes according to the altitude differences and the traffic situation, determines total fuel consumption data for each of the alternative routes, and selects the preferred route by comparing the total fuel consumption data for each of the alternative routes.

4. The ground vehicle navigation system as recited in claim 1, further comprising an information display for displaying the current vehicle position and the alternative routes.

5. The ground vehicle navigation system as recited in claim 1, further comprising an information display for displaying the current vehicle position and the preferred route requiring the least fuel consumption.

6. The ground vehicle navigation system as recited in claim 1, wherein said controller calculates altitude differences between adjacent predetermined intervals of the alternative routes according to the altitude information, and calculates fuel consumption required for each of the alternative routes.

7. The ground vehicle navigation system as recited in claim 1, wherein said controller repeats the selection of the preferred route requiring the least fuel consumption after a predetermined period of time elapses.

8. The ground vehicle navigation system as recited in claim 1, wherein said controller repeats the selection of the preferred route requiring the least fuel consumption after a predetermined distance of vehicle travel.

9. A ground vehicle navigation method for selecting a route according to fuel consumption, comprising the steps of:

selecting a destination;

receiving signals from GPS satellites;

determining a current vehicle position based on the signals received from the satellites;

determining alternative routes from the current vehicle position to the destination;

calculating fuel consumption required for each of the alternative routes based upon change of altitude of each of the alternative routes;

selecting from the alternative routes a preferred route requiring the least amount of fuel consumption; and displaying the preferred route.

10. The ground vehicle navigation method as recited in claim 9, wherein the displaying step further includes the substep of additionally displaying the current vehicle position and the alternative routes.

11. The ground vehicle navigation method as recited in claim 9, wherein the step of determining alternative routes from the current position to the destination includes the substep of reading route data from a memory.

12. The ground vehicle navigation method as recited in claim 9, further comprising the step of reading from a memory altitude information for the alternative routes.

13. The ground vehicle navigation method as recited in claim 12, wherein the step of calculating fuel consumption required for each of the alternative routes includes the substep of determining altitude differences between adjacent predetermined intervals of the alternative routes according to the altitude information.

14. The ground vehicle navigation method as recited in claim 9, wherein the step of calculating fuel consumption required for each of the alternative routes includes the substep of determining altitude differences between adjacent predetermined intervals of the alternative routes.

15. The ground vehicle navigation method as recited in claim 14, further comprising the step of receiving signals representative of traffic situation on local area routes, and wherein the step of calculating fuel consumption required for each of the alternative routes further includes the substep of determining the traffic situation for each of the alternative routes.

16. The ground vehicle navigation method as recited in claim 15, wherein the step of calculating fuel consumption required for each of the alternative routes further includes the substeps of reading from a memory respective fuel consumption data for each of the alternative routes according to the altitude differences and the traffic situation, and determining total fuel consumption data for each of the alternative routes, and wherein the step of selecting a preferred route includes the substep of comparing the total fuel consumption data for each of the alternative routes.

17. The ground vehicle navigation method as recited in claim 9, further comprising the step of receiving signals representative of traffic situation on local area routes.

18. The ground vehicle navigation method as recited in claim 17, wherein the step of calculating fuel consumption required for each of the alternative routes includes the substep of determining the traffic situation for each of the alternative routes.

19. The ground vehicle navigation method as recited in claim 9, further comprising the step of repeating after a predetermined period of time at least the step of selecting from the alternative routes a preferred route requiring the least amount of fuel consumption.

20. The ground vehicle navigation method as recited in claim 9, further comprising the step of repeating after a predetermined distance of vehicle travel at least the step of selecting from the alternative routes a preferred route requiring the least amount of fuel consumption.

* * * * *